United States Patent [19]
Edvardsson

[11] Patent Number: 5,543,720
[45] Date of Patent: Aug. 6, 1996

[54] DEVICE FOR GAUGING THE LEVEL OF A FLUID

[75] Inventor: Kurt O. Edvardsson, Linkoping, Sweden

[73] Assignee: SAAB Marine Electronics AB, Goteborg, Sweden

[21] Appl. No.: 170,305

[22] PCT Filed: Jun. 26, 1992

[86] PCT No.: PCT/SE92/00486

§ 371 Date: Mar. 2, 1994

§ 102(e) Date: Mar. 2, 1994

[87] PCT Pub. No.: WO93/01474

PCT Pub. Date: Jan. 21, 1993

[30] Foreign Application Priority Data

Jul. 4, 1991 [SE] Sweden ................... 9102087

[51] Int. Cl.$^6$ .......................... G01F 23/28; G01R 27/04
[52] U.S. Cl. ..................... 324/643; 324/631; 324/637; 324/642; 342/124
[58] Field of Search ........................ 324/631, 637, 324/639, 640, 642, 643; 342/124

[56] References Cited

U.S. PATENT DOCUMENTS

| | | | |
|---|---|---|---|
| 2,933,731 | 4/1960 | Foster et al. ........................... | 343/756 |
| 4,087,746 | 5/1978 | Kanae .................................... | 324/631 |
| 4,353,041 | 10/1982 | Bryans et al. ........................ | 333/21 A |
| 5,136,299 | 8/1992 | Edvardsson ........................... | 342/124 |
| 5,351,036 | 9/1994 | Brown et al. ......................... | 340/618 |

FOREIGN PATENT DOCUMENTS

WO90/09599  8/1990  WIPO.

Primary Examiner—Kenneth A. Wieder
Assistant Examiner—Glenn W. Brown
Attorney, Agent, or Firm—Lowe, Price, LeBlanc & Becker

[57] ABSTRACT

A device for gauging the level of a fluid in a container is described. It comprises a transmitter for transmitting a polarizable microwave signal through a first waveguide section, a receiver for receiving a reflected microwave signal, an electronic unit for determining the reflex position of the reflected microwave signal and an antenna means with a second waveguide section. The device is primarily characterized in that the transmitter and receiver, respectively, transmits and receives a waveguide mode each, mutually orthogonal, and by an easily replaceable third waveguide section (6, 16, 17) inserted between the first (2) and second (5) waveguide sections, provided with means (12, 14, 15, 22) for polarization and/or damping for optimal adaptation of the device to various containers and antennae.

7 Claims, 1 Drawing Sheet

U.S. Patent
Aug. 6, 1996
5,543,720
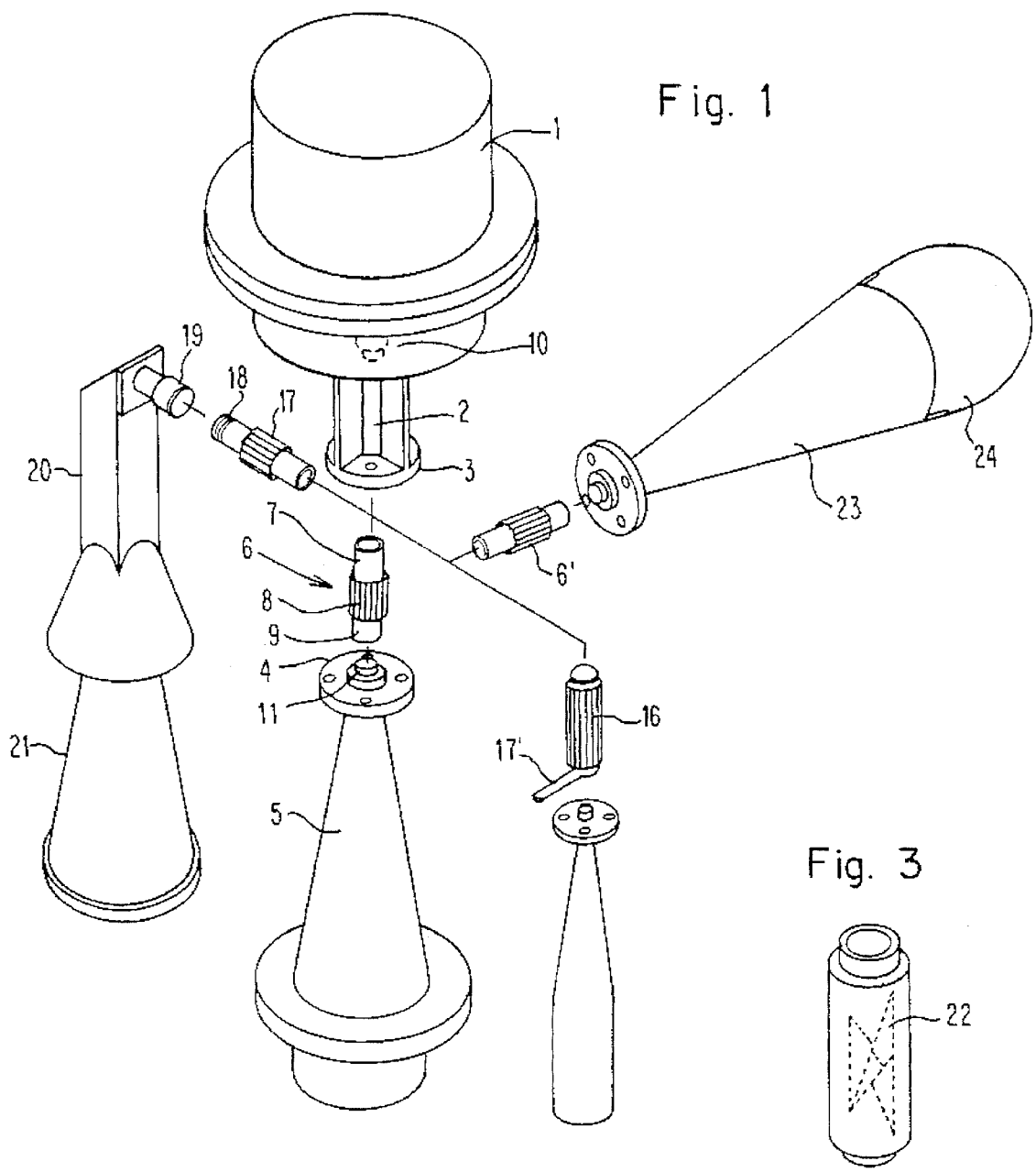
Fig. 1
Fig. 3
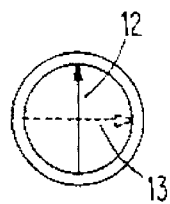 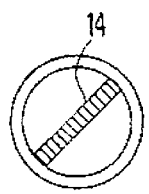 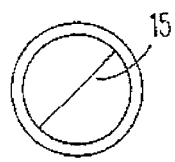 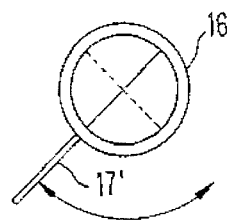 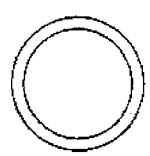
Fig. 2a  Fig. 2b  Fig. 2c  Fig. 2d  Fig. 2e

1

DEVICE FOR GAUGING THE LEVEL OF A FLUID

The present invention relates to a device for gauging the level of a fluid, that is, a flowing or granulate material, contained preferably in a container, comprising a transmitter for the transmission of a polarizable microwave signal through a first waveguide section, a receiver for receiving a reflected microwave signal, an electronic unit, arranged to determine the reflex position of the reflected microwave signal and an antenna means with a second waveguide section.

Such devices have been used for a long time, operating in the radar wavelength area, and recently, devices with very high measuring accuracy (e.g. 0.01%) have entered the market Typical users of such equipment are oil refineries and petrochemical industry, where level gauging takes place in large tanks. In such applications numerous various antennae or corresponding tank adaptions are required, depending on the construction of the tank. However, it is much desired, that the same type of electronic unit with transmitter and receiver can be used in those different tank constructions.

A number of contradictory demands on a device of the kind mentioned in the introduction exist in practice:

- to suppress corner echoes from the tank wall, a horn antenna with circularly polarized wave is suitable,
- when a thin antenna lobe is required, a linearly polarized parabol antenna is useful,
- in such cases, when a vertical measuring tube is used in a tank, to the extent this tube is partly located outside the tank, the leaking of electromagnetic waves must be limited, while at the same time, the sensitivity in gauging demands a certain signal level,
- in certain tanks a variable polarized wave is required,
- in certain cases of measuring it is favorable to let the transmission and reception occur in different polarizations in order to reduce the effect of internal antenna echoes.

In addition to its ordinary function, the ante means usually comprises a sealing function and must therefore be permanently installed, and is usually rather heavy. This means that a device of the kind mentioned in the introduction cannot meet all the contradictory demands mentioned above.

The object of this invention is therefore to achieve a device of the kind mentioned in the introduction, which in a simple way admits adaption to existing tank constructions with their various demands on the equipment in order that level gauging with high accuracy shall be achieved by using one and the same electronic unit. The device shall also be inexpensive to acquire.

According to the invention such a device is primarily characterized in that the transmitter and receiver are arranged respectively to transmit and receive microwave signals in their respective waveguide mode, which are mutually orthogonal, that is, mutually independent, and by a third waveguide section inserted between the first and second waveguide sections, and provided with means to act upon said microwave signal through polarization and/or damping for optimal adaption of the device to various containers and antennae, the first waveguide section being preferably circular in cross section. Suitably, the waveguide modes mentioned are linearly polarized, mutually perpendicular.

According to an embodiment of the invention a third waveguide section is provided with a dielectric plate set at an angle of 45° to the extension plane of the transmitted microwave to achieve various elliptic polarizations, of which right and left turned circular polarizations are typical. Thereby, a double circular polarization of the microwave can be obtained, suitable for a horn antenna. At reflection in the measuring surface the circular polarization is switched (+ to − or − to +) and on re-entrance through the third waveguide section a perpendicular linear polarization is obtained. The advantage is gained, that the portion of the transmitted microwave signal that is reflected against a wall is suppressed in that it is reflected one extra time and then gives a linear polarization in the transmitted polarization. In an alternative embodiment polarization of a third waveguide section is achieved with elliptic cross section or provided with internal ridges.

In another embodiment of the invention the third waveguide section comprises instead one or two plates of damping material, whereby the transmitted microwave signal is damped considerably (e.g. 20 dB) without the re-reflected signal being affected. In this case the third waveguide section replaces a ferite insulator but at a lower cost and with better environmental durability. The transmitted microwave signal is damped, which means that leakage radiation is reduced to a corresponding degree, which may be a requirement if level gauging is effected entirely or partly in free space. Such a case is when a perforated vertical tube is used as a waveguide in free space in ranks with so-called flowing roof.

If the third waveguide section is provided with a damping plate, set at an angle of 45° to one extension plane of the transmitted microwave, a linearly polarized wave is obtained in only one polarization, which admits a thinner antenna lobe via for instance a parabolic antenna.

In a special embodiment of the device according to the invention, the third waveguide section is arranged turnable relative to the first waveguide section, so that e.g. polarization of the microwave signal that comes from the transmitter can be changed by turning a stick in rigid connection with the waveguide section, without this having to be replaced.

According to an embodiment of the device according to the invention, in which said waveguide modes are linearly polarized, mutually perpendicular, the third waveguide section is empty internally in order to adapt a transmitted microwave signal to a diffuse surface, as is the case with a granulate material in said container, with simultaneous suppression of the echoe from the antenna means, it being symmetrically formed to the extension plane of either the transmitted or received signal.

The invention will now be described in more detail with reference to the accompanying figures of which:

FIG. 1, in perspective and taken to pieces, shows a device according to the invention with four alternative antenna means and four alternative third waveguide sections.

FIG. 2a shows a cross section through a first waveguide section.

FIG. 2b–2e show cross sections through four different third waveguide sections.

FIG. 3, shows, in perspective, a third waveguide section.

In FIG. 1 an electronic unit in combination with a transmitter and receiver of a microwave signal is designated by 1, and a first waveguide section connected thereto, by 2, which in its lower part is provided with a flange 3. A horn antenna, intended to be connected to the flange 3 shows a corresponding flange 4, mounted in one end of a second waveguide section 5. Between the electronic unit 1 and the horn antenna a third waveguide section 6 is shown in the form of a circular-cylindrical tube 7 with longitudinal ridges 8 arranged about the periphery, which are equally dispersed about the periphery save for a wider track 9 between two ridges to guide the rude. On mounting the device, the third waveguide section 6 is inserted into the first waveguide section 2 and is connected at the top to a waveguide connection 10 and at the bottom to a waveguide connection 11 at the second waveguide section 5 in the horn antenna.

The transmitter and receiver in this case are arranged respectively to transmit and receive microwave signals in a waveguide mode each, each linearly polarized, mutually perpendicular. The third waveguide section 6 can now be equipped with various insertion parts according to need. In the present case it can be provided with a plate of a dielectric material, set at an angle of 45° to the extension plane of the microwave signal that goes out from the transmitter and have such length that 90° phase difference is obtained. Thereby a double circular polarization is obtained of the microwave signal that goes out through the horn antenna. The wavelength is adjusted according to the actual dimensions of the equipment, but is, for instance, in the range of about 3 cm. As already mentioned, such a polarization is advantageous, if there is a risk that the transmitted microwave signal partly will be reflected against a tank wall on its way down to the surface that will be gauged. For each reflection the circular polarization switches (right to left and contrary) and thus, waves that are reflected twice can be discriminated from those reflected once.

If instead the device will be used for gauging in free space it may be suitable to provide a third waveguide section 6 with at least a plate of a damping material, such as metal or an insulating plate covered with a thin metal layer, so that the outgoing microwave signal is damped according to need. The outgoing signal is then damped without the incoming signal being damped.

If the horn antenna in FIG. 1 is replaced by a parabolic antenna, not shown, which may be needed if a thin antenna lobe is required, the third waveguide section 6 is equipped with a damping plate, set at an angle of 45° to the extension plane of the microwave signal that goes out from the transmitter. Thereby, as mentioned, a linearly polarized wave is obtained in only one polarization.

In FIG. 2 it is presented the cross section of *a*) a first waveguide section with the extension plane 12 for an outgoing microwave signal and the extension plane 13 for a received, reflected microwave signal. A plate of a dielectric material is designated in FIG. 2 *b*) by 14 and a plate of metal is designated in FIG. 2 *c*) by 15.

In case it is desirable to be able to vary polarization and damping in a third waveguide section, this can be effected as shown in FIG. 2 by designation 16. In this case the waveguide section is turnable, for instance by being provided with a control stick 17' in the form of a ribbon attached at the lower part of the waveguide section. On mounting, a middle layer is provided between the flanges 3 and 4, so that the waveguide section after insertion in the first waveguide section 2 can be turned. A cross section of this embodiment is shown in FIG. 2 *d*).

It should be observed that the wide track 9 in the third waveguide section 6 corresponds to a pin in the first waveguide section 2 so that the mutual turning position between the first and third waveguide sections which is turnable the pin is removed (not shown in the figure).

In FIG. 3 it is shown by dashed line an embodiment of a damping plate in a third waveguide section.

In an embodiment of the device according to the invention, as shown in FIG. 1, the third waveguide section, designated by 6', is empty internally as is evident from FIG. 2 *e*) in order to adjust a transmitted microwave signal to a diffuse surface, which occurs in a granulate material, the level of which shall be gauged, with simultaneous suppression of the echoe from the antenna means. The antenna means is here designed with a second waveguide section 23 in the form of a cone, with a metal mirror 24 set at an angle of 45°, arranged symmetrically to the extension plane of either the transmitted or received microwave signal.

In case the first waveguide section 2 must be set at right angles to the lobe direction of an antenna, an embodiment of the third waveguide section, as presented by the designation 17, can be used. This waveguide section is at the bottom provided with threads 18, corresponding to those in a sleeve 19 in connection with a second waveguide 20 in an antenna means 21. The waveguide section 17 is inserted as described above into the first waveguide section 2, after having been screwed into the sleeve 19. The antenna means 21 is then attached to the flange 3 with fastening means, not shown in the figure. The antenna means 21 in this case is connected to a vertical tube located in a tank, functioning as a waveguide, which means that the waveguide section 17, the first waveguide section 2 and the electronic unit 1 are located with their symmetry axes being horizontal.

I claim:

1. A device for determining the level of a fluid contained in a container, that is, a flowing or granulate material, comprising a transmitter for transmitting a polarizable microwave signal through a first waveguide section, a receiver for receiving a reflected microwave signal, an electronic unit, arranged to determine the reflex position of the reflected microwave signal, and an antenna means with a second waveguide section, the first waveguide section being preferably circular in cross section, characterized in that, the transmitter and receiver are arranged respectively to transmit and receive microwave signals in different waveguide modes which are mutually orthogonal, that is, mutually independent, and further characterized by an interchangeable third waveguide section inserted between the first and second waveguide sections, provided with means for acting upon said microwave signal through polarization and/or damping, for optimal adaption of the device to different containers and antennae.

2. A device according to claim 1, characterized in that said waveguide modes are linearly polarized, mutually perpendicular.

3. A device according to claim 2, characterized in that the third waveguide section is empty internally to adjust a transmitted microwave signal to a diffuse surface with simultaneous suppression of the echo from the antenna means, the antenna means being formed symmetrically to the extension plane of either the transmitted or received microwave signal.

4. A device according to claim 1, characterized in that the third waveguide section is provided with at least a plate of a damping material for damping the transmitted microwave signal, but not the received signal.

5. A device according to claim 4, characterized in that said plate of the damping material is set at an angle of 45° to the extension plane of the transmitted microwave signal in order to achieve linear polarization.

6. A device according to claim 1, characterized in that the third waveguide section is arranged turnable relative to the first waveguide section.

7. A device according to claim 1, characterized in that the third waveguide section is provided with a dielectric plate set at an angle of 45° to the extension plane of the microwave signal that goes out from the transmitter, in order to achieve different elliptic polarizations, of which right and left turned circular polarizations are typical.

\* \* \* \* \*